April 21, 1931. J. C. JENNEJOHN 1,801,605
FLUID LOCK FOR VULCANIZERS
Filed March 17, 1927 3 Sheets-Sheet 1
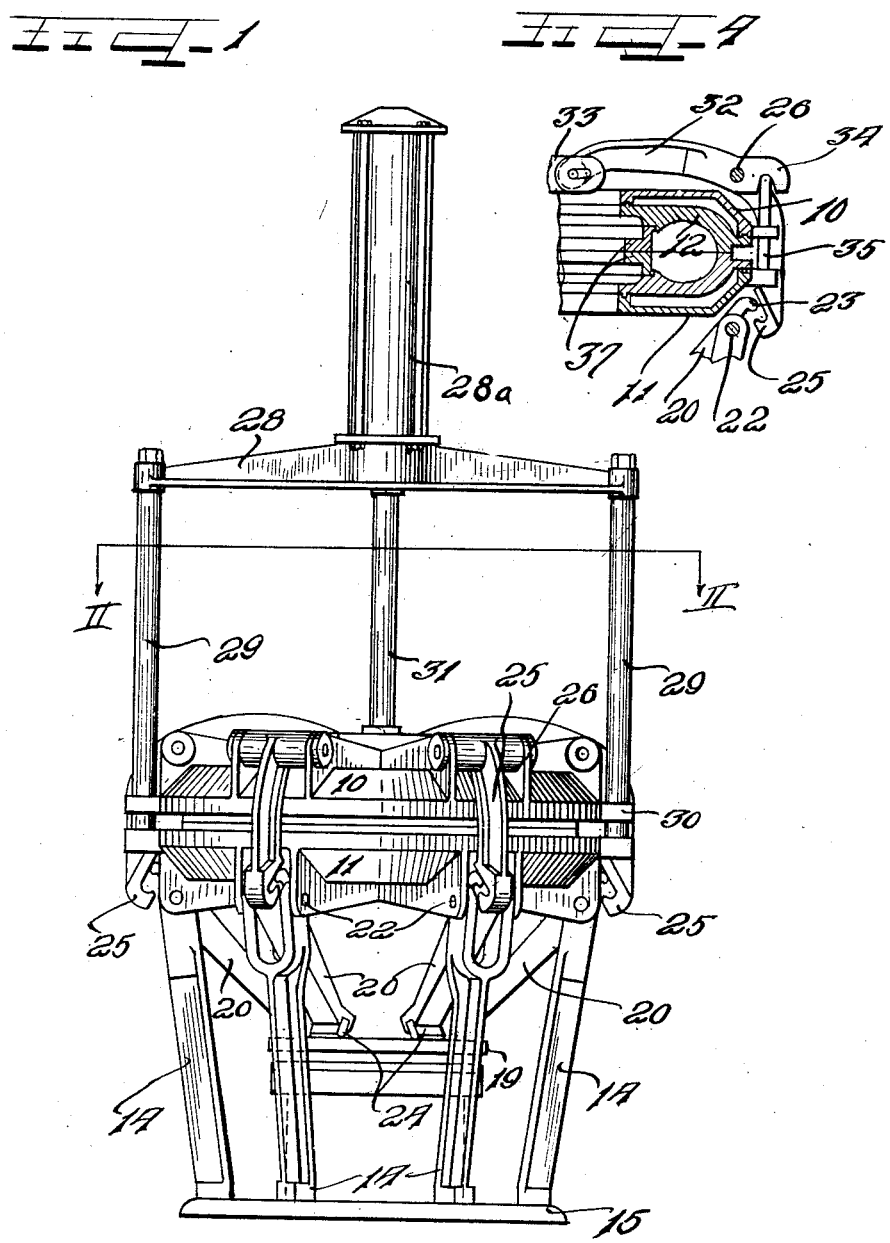
INVENTOR
John C. Jennejohn
BY Charles W. Hill
ATTYS

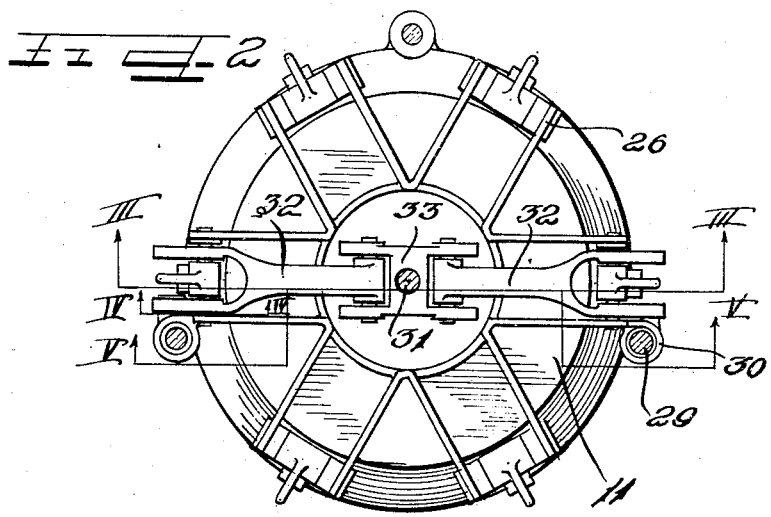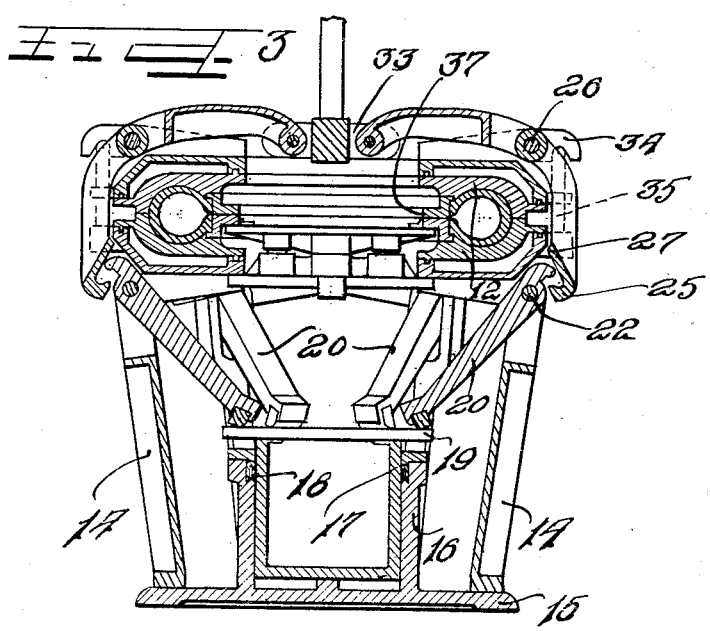

April 21, 1931.   J. C. JENNEJOHN   1,801,605
FLUID LOCK FOR VULCANIZERS
Filed March 17, 1927   3 Sheets-Sheet 3
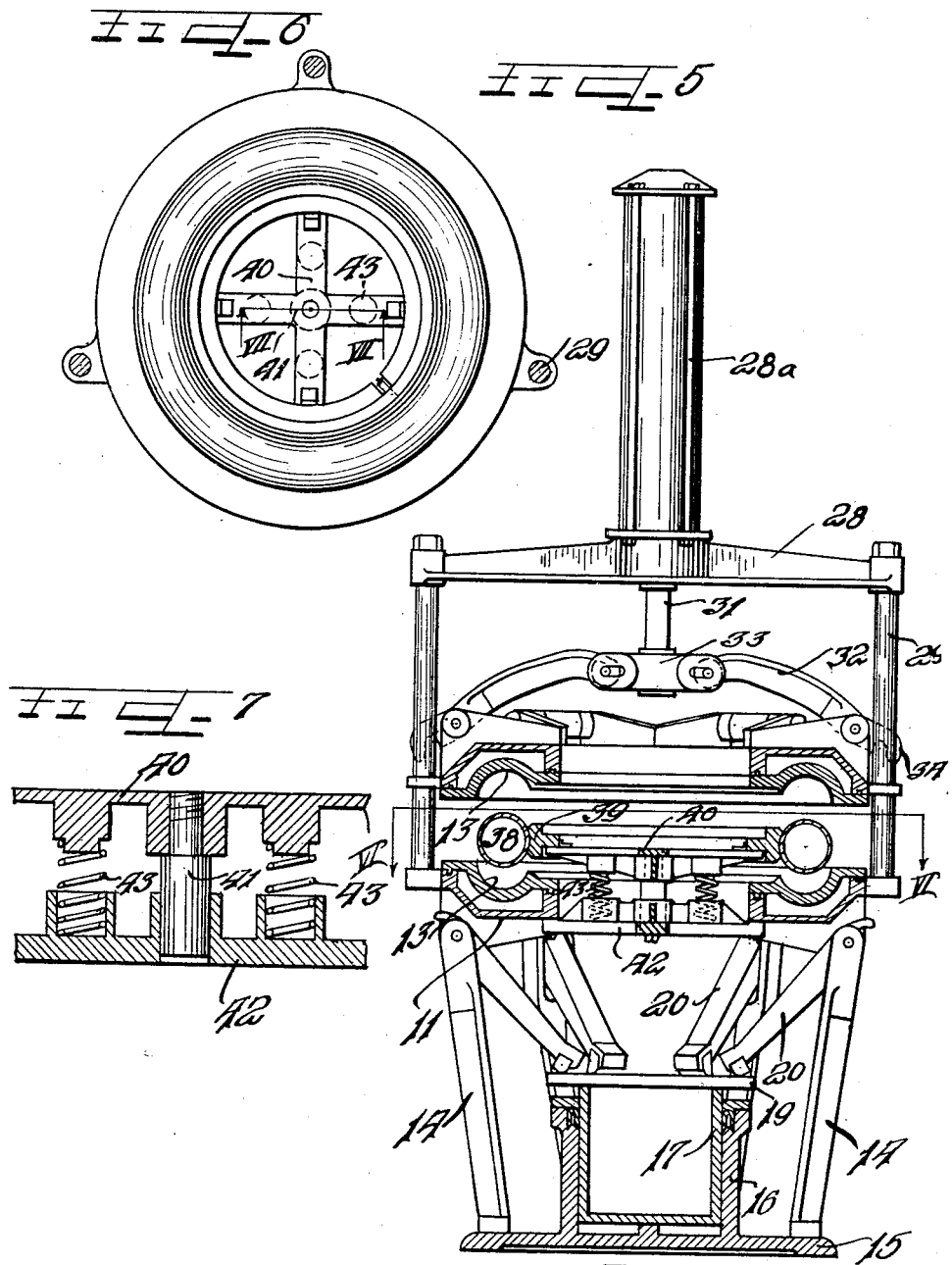
Inventor
John C. Jennejohn
by Charles W. Hills Attys Patented Apr. 21, 1931

1,801,605

UNITED STATES PATENT OFFICE

JOHN C. JENNEJOHN, OF CUDAHY, WISCONSIN, ASSIGNOR TO UTILITY MANUFACTURING CO., A CORPORATION OF WISCONSIN

FLUID LOCK FOR VULCANIZERS

Application filed March 17, 1927. Serial No. 175,962.

This invention relates to fluid locks for individual vulcanizers for pneumatic tires and tubes.

It is an object of this invention to provide an improved lock for individual vulcanizers wherein the locking pressure is imposed on the mold inside the perimeter of the outer joint in order that this pressure will not have a rocking effect with the joint as a fulcrum, such a rocking effect tending to distort the mold and allows the inner joint to open up slightly resulting in lack of proper pressure on the tire bead and in allowing rubber to flow out of the mold at this point.

It is also an object of this invention to provide an improved lock having fluid actuated locking means operated by a ram of suitable size to use fluid pressure from the same source as is used inside the tire during the vulcanizing process, so that if the pressure fails the bag will deflate along with the ram thus preventing accidents due to release of the lock while pressure is maintained in the tire.

It is another object of this invention to provide means adapted to multiply the leverage of the air cylinder used to lift the top half of the mold in order to insure breaking the joint which requires extra initial force in the case of non-skid tires because of the tread pattern in the mold.

It is still another object of this invention to provide a spring supported movable center for lifting the tire carcass and bead forming rings out of the lower half of the mold; thus facilitating removal and placement of the tire carcass, which is held clear of the lower half of the mold until the top half presses it down thereinto.

Other and further important objects of this invention will be apparent from the disclosures in the drawings and specification.

This invention (in a preferred form) is illustrated in the drawings and hereinafter more fully described.

On the drawings

Figure 1 is a side elevation of a device embodying the features of this invention.

Figure 2 is a section on the line II—II of Figure 1.

Figure 3 is a section on the line III—III of Figure 2.

Figure 4 is a fragmentary section on the line IV—IV of Figure 2.

Figure 5 is a section with the mold partly open, taken on the line V—V of Figure 2, opposite in direction to Figure 3 and having a tube mold substituted for the casing mold of Figure 3.

Figure 6 is a section on the line VI—VI of Figure 5.

Figure 7 is a fragmentary enlarged section on the line VII—VII of Figure 6.

As shown on the drawings

The vulcanizer proper comprises upper and lower shells 10 and 11 forming steam backs to which are bolted the upper and lower halves of the casing or tube molds 12 and 13 shown in Figures 3 and 5 respectively, the space between each mold half and its shell forming the steam space. The upper and lower sections are substantial duplicates but have been separately numbered to avoid confusion. The lower section 11 is supported by standards 14 resting on a table or platform 15, the center of which is formed with a fluid or hydraulic cylinder 16 with a ram 17 sealed by U packing 18 which is expanded by the fluid.

The top of the ram provides a plate 19 for actuating locking levers 20 pivoted at 22 to the lower shell 11, these levers having male hooks 23 on the locking end and replaceable shoes 24 on the other end which ride on the ram plate 19, these shoes being renewable both to compensate for wear and to closely adjust the various levers to produce an even locking pressure. Female hooks 25 depend from the upper shell 10 and are freely pivoted thereto at 26, these hooks having humps 27 which strike the edges of the mold to cause the hooks to swing free when the mold is being opened. The upper or female hooks 26 are pivoted back of their center of gravity so that they hug in close to the vulcanizer and engage the male hooks 23 when the molds are within an inch of closing. The pivots 22 and 26 are located inside the line of the outer joint between the upper and lower mold halves, thus preventing reversal of pressure on the inner joint as would be the case if the clamping pressure were applied outside the outer joint line. The top half of the mold 10 is lifted by means of an air hoist 28a which is mounted on a spider 28 supported on the columns 29 which are secured to the lower or stationary half of the mold, guide bosses 30 on the upper half encircling these columns which thus serve to align the mold halves. The piston rod 31 of the air hoist is attached indirectly to the upper half of the mold through a pair of levers 32 which have a sliding connection to a block 33 on the end of the piston rod and are pivoted at the same point 26 as the hooks 25, the outer end 34 of these levers 32 engaging pins 35 that pass through the upper shell 10 and press on the edge of the lower shell 11 to push the two halves apart after vulcanization. As the levers have a leverage ratio of about 5 to 1 in the drawings it will be evident that the initial opening force is multiplied in the same ratio so that a smaller air hoist can be used that is just sufficient to easily handle the weight of the upper half of the mold without necessitating the provision of extra capacity to break the joint. The levers 34 are arranged to have only a limited motion at their outer ends, say one inch, after which the levers become rigid and the hoist acts directly to lift the mold half up out of the way for the removal and replacement of the tire carcass 36 and bead rings 37 of Figue 3 or the tube 38 and tube ring 39 of Figure 5.

The bead rings 37 or tube ring 39, as the case may be, are supported on a spider 40 centered by a plunger 41 in a guide plate 42 bolted over the central aperture in the lower shell 11, this spider 40 being urged upwardly by springs 43 to lift the tire or tube out of the lower mold. Also when a raw tire or tube is set on the spring supported spider it holds the tire or tube away from the lower mold, but exactly centered thereover, until the top half descends and presses the tire or tube into the lower mold cavity, this spider preventing the hot lower mold from softening the raw tread or tube and causing a collapse thereof before the mold can be sealed and the pressure applied to the interior of the tire or tube. In describing the foregoing elements the function of each has been brought out so that only a general description of the operation is believed to be necessary.

When the raw tire or tube has been assembled with the bead forming rings or tube ring it is placed on the central spider and the top half of the mold lowered by controlling the air hoist. As the top half approaches within an inch of its final position the female hooks 25 engage the male hooks 23 on the levers 20 the air hoist either releasing entirely or being used to push down on the upper mold. The ram 17 is then raised by fluid pressure, preferably from the same source as is used to inflate the air bags in the tire or the tube itself, which may be inflated at the same time as the ram is raised as the pressure on the latter is sufficient to overbalance the air bag pressure at all times. After vulcanization pressure on the ram may be released at the same rate as that on the air bag to speed up the opening operation without danger of bursting the bag or tube by a premature release of the mold lock. The air hoist is then operated to first break the joint and next lift the top half clear of the stationary lower half, the spring backed spider 40 lifting the tire or tube clear of the lower mold.

It will thus be seen that I have produced a new and improved lock for vulcanizers adapted to speed up the charging and unloading operations thus increasing the output while insuring more even vulcanization and a proper mold seal.

I am aware that many changes may be made and numerous details of construction may be varied through a wide range without departing from the principles of this invention and I, therefore, do not purpose limiting the patent granted hereon, otherwise than necessitated by the prior art.

I claim as my invention:—

1. In an individual vulcanizer of the class described comprising movable and stationary casing halves, means adapted to move the movable casing half away from the stationary casing half, and a fluid lock for sealing said halves together comprising hooks associated with the movable casing half, levers associated with the stationary casing half and adapted to be automatically engaged by said hooks, and means adapted to operate said levers to clamp the casing halves together.

2. In an individual vulcanizer of the class described comprising movable and stationary casing halves, means adapted to move the movable casing half away from the stationary casing half, and a fluid lock for sealing said halves together comprising hooks associated with the movable casing half, levers associated with the stationary casing half and adapted to engage said hooks, and a fluid cylinder adapted to actuate said levers to clamp the casing halves together, said hooks being arranged to automatically snap into engagement with said levers upon the movement of the movable casing to a closed position.

3. In an individual vulcanizer of the class described comprising movable and stationary casing halves, means adapted to move the movable casing half away from the stationary casing half, said means including a joint breaker comprising levers increasing the force of said means and acting against the stationary casing half, and a fluid lock for sealing said halves together comprising hooks associated with the movable casing half, levers associated with the stationary casing half and adapted to be automatically engaged by said hooks, and means adapted to operate said latter levers to clamp the casing halves together.

4. In a two part vulcanizer of the class described, a stationary casing and a movable casing, means adapted to shift said movable casing to open and close said vulcanizer, means adapted to initially increase the power of said shifting means on its opening movement to break the seal of said joint, and locking means for said casings comprising automatic interengaging hooks having pivotal points inside the outer line of the outer joint between the casings whereby a clamping pressure will be exerted on both the inner and outer joints thereof.

5. In a two part vulcanizer of the class described, a stationary casing and a movable casing, means adapted to shift said movable casing to open and close said vulcanizer, means adapted to initially increase the power of said shifting means on its opening movement to break the seal of said joint, means adapted to yieldingly hold the article to be vulcanized out of contact with said stationary casing until the movable casing presses it into said stationary casing, and locking means for said casings comprising interengaging hooks having pivotal points inside the outer line of the outer joint between the casings whereby a clamping pressure will be exerted on both the inner and outer joints thereof, said hooks being arranged for automatic engagement upon a movement of the movable casing to its closed position.

6. In combination, in a vulcanizer, a pair of cooperable mold casings, means for moving one of said casings into and out of cooperation with the other, said casings when in cooperation having a mechanically sealed joint, and means operable by said first mentioned means to cause a force of increasing value to be built up and applied to said casings to break the seal, said latter means being inoperative upon the breaking of the joint and said first mentioned means continuing its opening operation to move said movable casing away from the other casing.

7. In combination, in a vulcanizer, a pair of cooperable mold casings, means for moving one of said casings into and out of cooperation with the other, said casings when in cooperation having a mechanically sealed joint, and means operable by said first mentioned means to cause a force of increasing value to be built up and applied to said casings to break the seal, said latter means including members connected to the movable casing and adapted to be forced into engagement with a peripheral portion of said other casing by said first mentioned means at the beginning of the opening stroke.

8. In combination, in a vulcanizer, a pair of cooperable mold casings, means for moving one of said casings into and out of cooperation with the other, said casings when in cooperation having a mechanically sealed joint, and means operable by said first mentioned means to cause a force of increasing value to be built up and applied to said casings to break the seal, said first mentioned means including a plurality of levers and said latter mentioned means including members arranged to be engaged by the short legs of said levers, whereby a force of increasing value is applied to said members to break the seal upon the beginning of the opening stroke.

9. In combination, in a vulcanizer, a pair of cooperable mold casings having inner and outer joints, means adapted to shift one of said casings relative to the other including levers disposed above the movable casing, levers disposed below and under the other casing, and means interconnecting said levers disposed adjacent the outer joint between said casings and without the dimensions of said casings, said levers having pivotal points located inside the outer line of said outer joint, said connecting means being cooperable with said levers to enable a clamping pressure to be exerted on both the inner and outer joints between the casings, whereby said casings are prevented from pivoting about the outer joints when pressure is applied to clamp them together.

10. In combination, in a vulcanizer, a pair of cooperable mold casings having inner and outer joints, means adapted to shift one of said casings relative to the other including levers disposed above the movable casing, levers disposed below and under the other casing, and means interconnecting said levers disposed adjacent the outer joint between said casings and without the dimensions of said casings, said levers having pivotal points located inside the outer line of said outer joint, the levers associated with one of said casings including clamping hooks, said connecting means including hooks cooperable with said clamping hooks to enable the casings to be clamped together, said pivots of the levers enabling the pressure to be exerted on both the inner and outer joints between the casings and serving to prevent the casings from pivoting on the outer joint when pressure is applied to clamp them together.

11. In combination, in a vulcanizer, a pair of cooperable mold casings, one of said casings being movable relative to the other, hoisting means associated with said movable casing, pressure means associated with the other casing adapted to clamp the mold casings together, whereby a mechanically sealed joint is formed between the casings, means for connecting said hoist means to the movable casing including a plurality of levers pivotally connected to and directly over said movable casing, said pivots being disposed within the circular dimensions of said casing, and a plurality of levers pivotally connected to said other casing adapted to be engaged by said pressure means, said levers having their pivot points connected to and disposed directly below said other casing and within the periphery of said casings, each of said latter levers having one of its legs provided with a hook, said other levers each having one of its legs extending downwardly alongside of the peripheral edges of said casings and having its lower end provided with a clamping hook, said clamping hooks being adapted to automatically engage said other hooks when said casings are clamped together.

12. In combination, in a vulcanizer, a pair of cooperable mold casings, one of said casings being movable relative to the other, hoisting means associated with said movable casing, pressure means associated with the other casing adapted to clamp the mold casings together, whereby a mechanically sealed joint is formed between the casings, means for connecting said hoist means to the movable casing including a plurality of levers pivotally connected to and directly over said movable casing, said pivots being disposed within the circular dimensions of said casing, a plurality of levers pivotally connected to said other casing adapted to be engaged by said pressure means, said levers having their pivot points connected to and disposed directly below said other casing and within the periphery of said casings, each of said latter levers having one of its legs provided with a hook, said other levers each having one of its legs extending downwardly alongside of the peripheral edges of said casings and having its lower end provided with a clamping hook, said clamping hooks being adapted to automatically engage said other hooks when said casings are clamped together, said casings when in cooperation having a mechanically sealed joint, and joint breaking means adapted to be engaged by the levers associated with said movable casing to cause a force of increasing value to be applied to the lower casing for the purpose of forcing the movable casing out of engagement therewith.

13. In combination, in a vulcanizer, a pair of cooperable mold casings adapted when in engagement to have a mechanically sealed joint, means for moving one of said casings relative to the other and into cooperation therewith, said other casing having a peripheral flange portion, and joint breaking means associated with said first mentioned means adapted to exert a force at a plurality of points on said flange portion to cause said movable casing to be separated from the other casing.

14. In combination, in a vulcanizer, a pair of cooperable mold casings adapted when in engagement to have a mechanically sealed joint, means for moving one of said casings relative to the other and into cooperation therewith, said other casing having a peripheral flange portion, and joint breaking means associated with said first mentioned means adapted to exert a force on said flange portion to cause said movable casing to be separated from the other casing, said latter means being actuated by said first mentioned means with a leverage force of increasing value.

15. In a two part vulcanizer of the class described, a pair of cooperable mold casings arranged to be sealed together, means for moving one of the casings out of cooperation with the other and means operable by said moving means during a portion of the latter's stroke to initially increase the power of said moving means on its opening movement to break the seal between said casings and arranged to be inoperative during the remaining portion of the stroke of said opening means.

16. In a two part vulcanizer of the class described, a pair of cooperable mold casings arranged to be sealed together, means for moving one of the casings out of cooperation with the other, means operable by said moving means during a portion of the latter's stroke to initially increase the power of said moving means on its opening movement to break the seal between said casings and arranged to be inoperative during the remaining portion of the stroke of said opening means, said moving means including levers pivotally associated with the movable casing and means associated with the other casing for engaging said levers to clamp and lock said casings together.

17. In a two part vulcanizer of the class described, a pair of cooperable mold casings arranged to be sealed together, means for moving one of the casings out of cooperation with the other, means operable by said moving means during a portion of the latter's stroke to initially increase the power of said moving means on its opening movement to break the seal between said casings and arranged to be inoperative during the remaining portion of the stroke of said opening means, said moving means including levers pivotally associated with the movable casing and means associated with the other casing for engaging said levers to clamp and lock said casings together, said latter means comprising a plurality of levers pivotally disposed under said other casing and arranged to engage said first mentioned levers.

18. In a two part vulcanizer of the class described, a pair of cooperable mold casings arranged to be sealed together, means for moving one of the casings out of cooperation with the other, means operable by said moving means during a portion of the latter's stroke to initially increase the power of said moving means on its opening movement to break the seal between said casings and arranged to be inoperative during the remaining portion of the stroke of said opening means, said moving means including levers pivotally associated with the movable casing, means associated with the other casing for engaging said levers to clamp and lock said casings together, said latter means comprising a plurality of levers pivotally disposed under said other casing and arranged to engage said first mentioned levers and power means for forcibly causing said latter levers to engage said first mentioned levers.

In testimony whereof I have hereunto subscribed my name.

JOHN C. JENNEJOHN.